US009769472B2

(12) United States Patent
Liu et al.

(10) Patent No.: US 9,769,472 B2
(45) Date of Patent: Sep. 19, 2017

(54) METHOD AND APPARATUS FOR INTRA PREDICTION USING NON-SQUARE BLOCKS

(75) Inventors: Shan Liu, San Jose, CA (US); Ximin Zhang, San Jose, CA (US); Shaw-Min Lei, Hsinchu (TW)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 289 days.

(21) Appl. No.: 14/234,152

(22) PCT Filed: Jul. 26, 2012

(86) PCT No.: PCT/CN2012/079165
§ 371 (c)(1),
(2), (4) Date: Jan. 22, 2014

(87) PCT Pub. No.: WO2013/023518
PCT Pub. Date: Feb. 21, 2013

(65) Prior Publication Data
US 2014/0140404 A1 May 22, 2014

Related U.S. Application Data

(60) Provisional application No. 61/524,686, filed on Aug. 17, 2011, provisional application No. 61/556,526, (Continued)

(51) Int. Cl.
*H04N 19/105* (2014.01)
*H04N 19/182* (2014.01)
(Continued)

(52) U.S. Cl.
CPC ..... *H04N 19/00024* (2013.01); *H04N 19/105* (2014.11); *H04N 19/11* (2014.11);
(Continued)

(58) Field of Classification Search
None
See application file for complete search history.

(56) References Cited

U.S. PATENT DOCUMENTS

2006/0176962 A1 8/2006 Arimura et al.
2011/0135000 A1* 6/2011 Alshina ............... H04N 19/105
375/240.13
(Continued)

FOREIGN PATENT DOCUMENTS

CN 101826127 9/2010

OTHER PUBLICATIONS

Lim et al. ("Description of video coding technology proposal by SK telecom, Sejong Univ. and Sungkyunkwan Univ.", JCT-VC, Dresden, DE, Apr. 15-23, 2010).*
(Continued)

*Primary Examiner* — Mohammad J Rahman
(74) *Attorney, Agent, or Firm* — McClure, Qualey & Rodack, LLP

(57) ABSTRACT

A method and apparatus for Intra prediction of a block based on neighboring pixels around the block are disclosed. Embodiments according to the present invention use square blocks as well as non-square blocks for Intra prediction. For a 2N×2N Luma CU (coding unit), the CU can be partitioned into 2N×N, N×2N, 2N×2N or N×N PUs. The 2N×N and N×2N PUs can be further processed by either square transforms only or both non-square and square transforms. In one embodiment, the 2N×N PU or the N×2N PU is processed as two N×N TUs (transform units) and each of the N×N TU is further split into smaller N×N TUs based on quad-tree split. In another embodiment, the 2N×N and N×2N PUs are processed as two 2N×0.5N and 0.5N×2N TUs respectively.

27 Claims, 6 Drawing Sheets

Related U.S. Application Data filed on Nov. 7, 2011, provisional application No. 61/564,696, filed on Nov. 29, 2011, provisional application No. 61/583,830, filed on Jan. 6, 2012, provisional application No. 61/613,743, filed on Mar. 21, 2012.

(51) Int. Cl.

| | | |
|---|---|---|
| *H04N 19/136* | (2014.01) | |
| *H04N 19/176* | (2014.01) | |
| *H04N 19/147* | (2014.01) | |
| *H04N 19/11* | (2014.01) | |
| *H04N 19/132* | (2014.01) | |
| *H04N 19/70* | (2014.01) | |
| *H04N 19/119* | (2014.01) | |
| *H04N 19/122* | (2014.01) | |
| *H04N 19/593* | (2014.01) | |
| *H04N 19/33* | (2014.01) | |

(52) U.S. Cl.
CPC ......... *H04N 19/119* (2014.11); *H04N 19/122* (2014.11); *H04N 19/132* (2014.11); *H04N 19/136* (2014.11); *H04N 19/147* (2014.11); *H04N 19/176* (2014.11); *H04N 19/182* (2014.11); *H04N 19/33* (2014.11); *H04N 19/593* (2014.11); *H04N 19/70* (2014.11)

(56) References Cited

U.S. PATENT DOCUMENTS

| | | | | |
|---|---|---|---|---|
| 2011/0243225 A1* | 10/2011 | Min | ........................ | H04N 19/44 375/240.12 |
| 2011/0255600 A1* | 10/2011 | Lin | ...................... | H04N 19/139 375/240.16 |
| 2012/0128070 A1* | 5/2012 | Kim | ..................... | H04N 19/176 375/240.13 |
| 2012/0183054 A1* | 7/2012 | Maani | .................. | H04N 19/159 375/240.08 |
| 2012/0314766 A1* | 12/2012 | Chien | .................. | H04N 19/176 375/240.12 |
| 2013/0022107 A1* | 1/2013 | Van der Auwera | ............. | H04N 7/26117 375/240.03 |
| 2013/0022108 A1* | 1/2013 | Panusopone | ......... | H04N 19/159 375/240.03 |
| 2013/0039417 A1* | 2/2013 | Wang | ................... | H04N 19/176 375/240.12 |
| 2013/0089265 A1* | 4/2013 | Yie | ......................... | G06T 9/004 382/238 |
| 2013/0094572 A1* | 4/2013 | Van der Auwera | ........... | H04N 19/00096 375/240.03 |
| 2013/0107950 A1* | 5/2013 | Guo | ....................... | H04N 19/70 375/240.12 |
| 2013/0272623 A1* | 10/2013 | Jeon | ........................ | H04N 7/46 382/238 |
| 2015/0264372 A1* | 9/2015 | Kolesnikov | ............ | H04N 19/52 375/240.16 |
| 2015/0381980 A1* | 12/2015 | Tsuchiya | .............. | H04N 19/176 375/240.02 |
| 2016/0241882 A1* | 8/2016 | Sato | ........................ | H04N 19/33 |
| 2017/0019669 A1* | 1/2017 | Heo | ..................... | H04N 19/119 |

OTHER PUBLICATIONS

Liu, S., et al; "Rectangular (2N×N and N×2N) Intra Prediction:" Joint Collaborative Team on Video Coding (JCT-VC) of ITU-T SG16 WP3 and ISO/IEC JTC1/SC29/WG11; Nov. 2011; pp. 1-6.

Cao, X., et al; "CE6.b1 Report on Short Distance Intra Prediction Method;" Joint Collaborative Team on Video Coding (JCT-VC) of ITU-T SG16 WP3 and ISO/IEC JTC1/SC29/WG11; Mar. 2011; pp. 1-6.

Yuan, Y., et al; "CE2: Non-Square Quadtree Transform for Symmetric and Asymmetric Motion Partition;" Joint Collaborative Team on Video Coding (JCT-VC) of ITU-T SG16 WP3 and ISO/IEC JTC1/SC29/WG11; Jul. 2011; pp. 1-8.

\* cited by examiner

METHOD AND APPARATUS FOR INTRA PREDICTION USING NON-SQUARE BLOCKS

CROSS REFERENCE TO RELATED APPLICATIONS

The present invention claims priority to U.S. Provisional Patent Application Ser. No. 61/524,686, filed Aug. 17, 2011, entitled "Method and apparatus of Intra prediction and mode coding for video compression", U.S. Provisional Patent Application Ser. No. 61/556,526 filed Nov. 4, 2011, entitled "Method and apparatus of rectangular Intra prediction for video compression", U.S. Provisional Patent Application Ser. No. 61/564,696, filed Nov. 29, 2011, entitled "Method for signaling multiple prediction units in an Intra coding unit in HEVC", U.S. Provisional Patent Application Ser. No. 61/583,830, filed Jan. 6, 2012, entitled "System and methods of coding non-square Intra prediction unit for video compression" and U.S. Provisional Patent Application Ser. No. 61/613,743, filed Mar. 21, 2012, entitled "Method and apparatus of rectangular Intra prediction in HEVC". The U.S. Provisional Patent Applications are hereby incorporated by reference in their entireties.

TECHNICAL FIELD

The present invention relates to video coding. In particular, the present invention relates to Intra coding techniques associated with partition of prediction units and coding units using non-square blocks.

BACKGROUND

Motion compensated inter-frame coding has been widely adopted in various coding standards, such as MPEG-1/2/4 and H.261/H.263/H.264/AVC. While motion-compensated inter-frame coding can effectively reduce bitrate for compressed video, Intra mode coding is still required to process an initial picture or to periodically insert I-pictures (or Intra-coded picture, I-picture), and the I-pictures are inserted periodically to allow quick access to the compressed video data or to alleviate error propagation. Intra prediction exploits the spatial correlation within a picture or within a picture region. In order to further improve coding efficiency, the High-Efficiency Video Coding (HEVC) standard being developed exploits block-based spatial prediction extensively. In HEVC, multiple Intra prediction modes are used to exploit spatial features.

In AVC, the size of a prediction unit (or block) that is coded using Intra prediction can be 4×4, 8×8 or 16×16. There are nine Intra prediction modes for Luma blocks at 4×4 and 8×8, as shown in Table 1 and Table 2 respectively. There are four Intra prediction modes for Luma 16×16 blocks, as shown in Table 3 and there are four Intra prediction modes for Chroma blocks, as shown in Table 4. The AVC intra prediction directions are shown in FIG. 1.

TABLE 1

| Intra4x4PredMode [luma4x4BlkIdx] | Name of Intra4x4PredMode[luma4x4BlkIdx] |
| --- | --- |
| 0 | Intra_4x4_Vertical (prediction mode) |
| 1 | Intra_4x4_Horizontal (prediction mode) |
| 2 | Intra_4x4_DC (prediction mode) |
| 3 | Intra_4x4_Diagonal_Down_Left (prediction mode) |

TABLE 1-continued

| Intra4x4PredMode [luma4x4BlkIdx] | Name of Intra4x4PredMode[luma4x4BlkIdx] |
| --- | --- |
| 4 | Intra_4x4_Diagonal_Down_Right (prediction mode) |
| 5 | Intra_4x4_Vertical_Right (prediction mode) |
| 6 | Intra_4x4_Horizontal_Down (prediction mode) |
| 7 | Intra_4x4_Vertical_Left (prediction mode) |
| 8 | Intra_4x4_Horizontal_Up (prediction mode) |

TABLE 2

| Intra8x8PredMode [luma8x8BlkIdx] | Name of Intra8x8PredMode[luma8x8BlkIdx] |
| --- | --- |
| 0 | Intra_8x8_Vertical (prediction mode) |
| 1 | Intra_8x8_Horizontal (prediction mode) |
| 2 | Intra_8x8_DC (prediction mode) |
| 3 | Intra_8x8_Diagonal_Down_Left (prediction mode) |
| 4 | Intra_8x8_Diagonal_Down_Right (prediction mode) |
| 5 | Intra_8x8_Vertical_Right (prediction mode) |
| 6 | Intra_8x8_Horizontal_Down (prediction mode) |
| 7 | Intra_8x8_Vertical_Left (prediction mode) |
| 8 | Intra_8x8_Horizontal_Up (prediction mode) |

TABLE 3

| Intra16x16PredMode | Name of Intra16x16PredMode |
| --- | --- |
| 0 | Intra_16x16_Vertical (prediction mode) |
| 1 | Intra_16x16_Horizontal (prediction mode) |
| 2 | Intra_16x16_DC (prediction mode) |
| 3 | Intra_16x16_Plane (prediction mode) |

TABLE 4

| intra_chroma_pred_mode | Name of Intra Chroma Prediction Mode |
| --- | --- |
| 0 | Intra_Chroma_DC (prediction mode) |
| 1 | Intra_Chroma_Horizontal (prediction mode) |
| 2 | Intra_Chroma_Vertical (prediction mode) |
| 3 | Intra_Chroma_Plane (prediction mode) |

In HEVC, each picture is divided into a set of square coding units (CUs). Each coding unit may be further divided into multiple prediction units (PUs). In the HEVC Committee Draft (CD) and Test Model Version 6.0 (HM-6.0), a 2N×2N CU may include PUs with partition sizes 2N×2N and N×N for an Intra coded frame or slice as shown in FIG. 2A. A 2N×2N CU may include PUs with partition sizes 2N×2N, N×2N, 2N×N and N×N for an Inter coded frame or slice as shown in FIG. 2B. Note that the N×N prediction type may only exist in smallest coding units (SCU) for both Intra and Inter cases.

In HM-6.0, the prediction and partition modes and the binarization are defined in Table 5, where PredMode refers to the prediction mode (Intra or Inter), part_mode refers to the partition mode, cLog2CUSize is associated with the current CU size, Log2MinCUSize is associated with the minimum CU size, and inter_4x4_enabled_flag refers to a flag for indicating whether Inter 4x4 mode is enabled.

TABLE 5

| | Value of | | | Bin string | |
| | | | | cLog2CUSize == Log2MinCUSize | |
| PredMode | part_mode | PartMode | cLog2CUSize > Log2MinCUSize | cLog2CUSize == 3 && !inter_4x4_enabled_flag | cLog2CUSize > 3 \|\| inter_4x4_enabled_flag |
| --- | --- | --- | --- | --- | --- |
| MODE_INTRA | 0 | PART_2Nx2N | — | 1 | 1 |
| | 1 | PART_NxN | — | 0 | 0 |
| MODE_INTER | 0 | PART_2Nx2N | 1 | 1 | 1 |
| | 1 | PART_2NxN | 011 | 01 | 01 |
| | 2 | PART_Nx2N | 001 | 00 | 001 |
| | 3 | PART_NxN | — | — | 000 |
| | 4 | PART_2NxnU | 0100 | — | — |
| | 5 | PART_2NxnD | 0101 | — | — |
| | 6 | PART_nLx2N | 0000 | — | — |
| | 7 | PART_nRx2N | 0001 | — | — |

In HM-6.0 common test conditions, the Luma CU size can be 64×64, 32×32, 16×16 and 8×8. The smallest CU can be further split into four prediction units (PUs) such that if, for example, the smallest CU size is 8×8, the PU can be split into four 4×4 square PUs. Therefore, the Luma Intra prediction unit size can be 64×64, 32×32, 16×16, 8×8 and 4×4. In HM-6.0, 35 Intra prediction modes (as shown in FIG. 3A) are allowed for all Luma PU sizes and 6 modes are allowed for Intra Chroma predictions. It is desired to improve the coding efficiency of Intra prediction by including non-square prediction modes and exploring associated non-square transforms.

SUMMARY

A method and apparatus for Intra prediction of a block based on neighboring pixels around the block are disclosed. In one embodiment according to the present invention, the method and apparatus for Intra prediction of a block based on neighboring pixels around the block comprises receiving a Luma block corresponding to Luma pixels of the block; and performing Intra prediction for the Luma block based on neighboring Luma pixels, wherein the Luma block is partitioned into one or more PUs (prediction units) having a shape from a group consisting of a square shape and a non-square shape. For a 2N×2N Luma CU (coding unit), the CU can be partitioned into 2N×N, N×2N, 2N×2N or N×N PUs. Furthermore, the partition modes associated with the PUs are indicated using a codeword table for the Luma block in Intra and Inter slices, wherein the codeword table includes entries for the 2N×N and N×2N PUs. The 2N×N and N×2N PUs can be further processed by either square transforms only or both non-square and square transforms.

When the 2N×N and N×2N PUs are processed by square transforms only or both non-square and square transforms, three embodiments according to the present invention are disclosed. In the first embodiment, the 2N×N PU or the N×2N PU is processed as two N×N TUs (transform units) and each of the N×N TU is further split into smaller N×N TUs based on quad-tree split if the N×N TU is larger than a smallest size. The smaller N×N TUs associated with the 2N×N PU or the N×2N PU use a same Intra prediction mode as the 2N×N PU or the N×2N PU respectively. In this case, the smallest size-is? 4×4. In the second embodiment, the 2N×N and N×2N PUs are processed as two 2N×0.5N and 0.5N×2N TUs respectively. The 2N×0.5N and 0.5N×2N TUs can be further split into smaller 2N×0.5N and 0.5N×2N TUs respectively based on quad-tree split if the 2N×0.5N and 0.5N×2N TUs are larger than a respective smallest size. In the third embodiment, the 2N×N and N×2N PUs are processed as two 2N×0.5N and 0.5N×2N TUs respectively if the 2N×2N Luma CU is larger than 8×8, and the 2N×N and N×2N PUs are processed as two 4×4 TUs if the 2N×2N Luma CU has a size of 8×8.

In another embodiment of the present invention, the method for Intra prediction further comprises receiving a Chroma block corresponding to Chroma pixels of the block; and performing Intra prediction for the Chroma block, wherein the Chroma block is partitioned into one or more Chroma PUs having the square shape only. The Chroma block corresponding to a 2N×2N CU is Intra predicted using N×N block size, wherein a candidate set of Chroma Intra prediction modes is derived for the Chroma block. An ordered mode set of Chroma Intra prediction modes consisting of {LM, DM0, DM1, Planar, Vertical, Horizontal, DC and Vertical+8} can be used to derive a candidate set for the Chroma Intra prediction modes, wherein DM0 and DM1 correspond to two DMs (direct modes) associated with two non-square PUs of a 2N×2N Luma CU respectively, and wherein first six different modes of the ordered mode set are selected as candidate modes for Chroma Intra prediction.

DETAILED DESCRIPTION

In order to improve coding efficiency, embodiments according to the present invention utilize new Intra prediction partition structures, new syntax and new Intra prediction mode coding methods. CU (coding unit) partition for Intra prediction according to the present invention includes partition sizes 2N×N and N×2N. Therefore, when the prediction mode of a CU is Intra, the prediction block size for a 2N×2N CU can be 2N×2N, 2N×N or N×2N if it is larger than an SCU. Otherwise the prediction block size of this CU can be 2N×2N, 2N×N, N×2N or N×N if it is an SCU (smallest CU). The partition modes and binarization according to an embodiment of the present invention are illustrated in Table 6. The codes for partition modes associated with MODE_INTER stay the same as these in Table 5. The code assignment for partition modes of MODE_INTRA as shown in Table 6 illustrates an example to practice an embodiment of the present invention. The particular code assignment illustrated should not be construed as limitations to the present invention. A person skilled in the art may use other code assignments to practice the present invention.

TABLE 6

| | | | Bin string | | |
| --- | --- | --- | --- | --- | --- |
| | | | | cLog2CUSize == Log2MinCUSize | |
| PredMode | Value of part_mode | PartMode | cLog2CUSize > Log2MinCUSize | cLog2CUSize == 3 && !inter_4x4_enabled_flag | cLog2CUSize > 3 \|\| inter_4x4_enabled_flag |
| MODE_INTRA | 0 | PART_2Nx2N | 1 | 1 | 1 |
| | 1 | PART_NxN | — | 01 | 01 |
| | 2 | PART_2NxN | 01 | 001 | 001 |
| | 3 | PART_Nx2N | 00 | 000 | 000 |
| MODE_INTER | 0 | PART_2Nx2N | 1 | 1 | 1 |
| | 1 | PART_2NxN | 011 | 01 | 01 |
| | 2 | PART_Nx2N | 001 | 00 | 001 |
| | 3 | PART_NxN | — | — | 000 |
| | 4 | PART_2NxnU | 0100 | — | — |
| | 5 | PART_2NxnD | 0101 | — | — |
| | 6 | PART_nLx2N | 0000 | — | — |
| | 7 | PART_nRx2N | 0001 | — | — |

Figure 1:
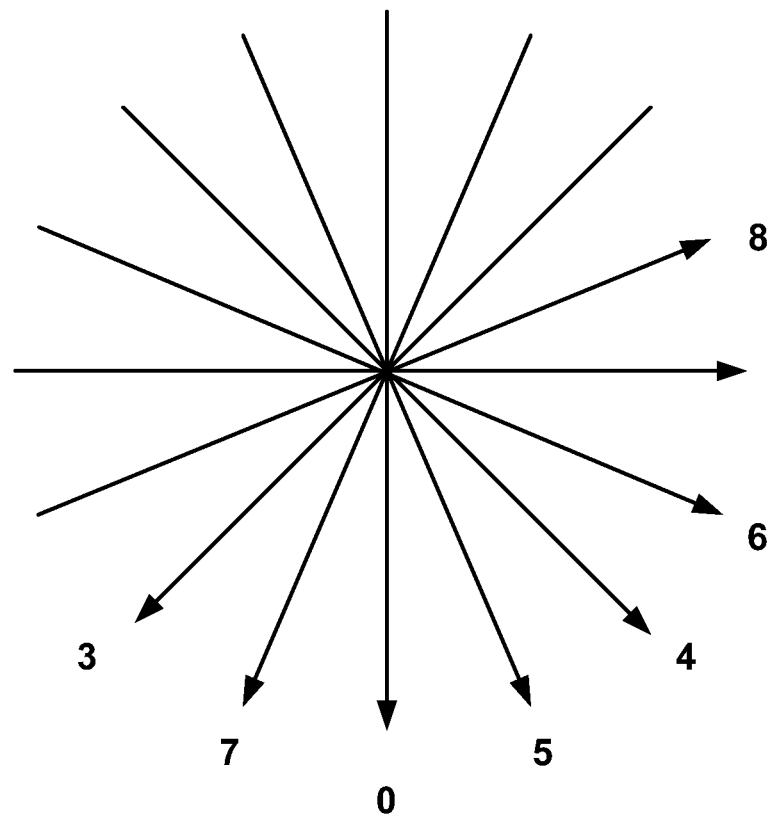
FIG. 1 illustrates Intra prediction mode directions used by H.264/AVC.
Figure 2A:
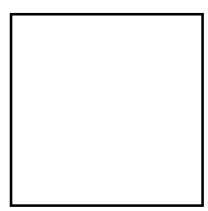
FIG. 2A-B illustrate partition types for a 2N×2N coding unit in the Intra and Inter prediction modes of High Efficiency Video Coding (HEVC) respectively.
Figure 2A:
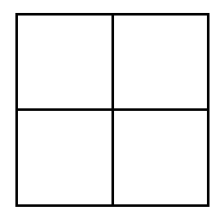
Figure 2B:
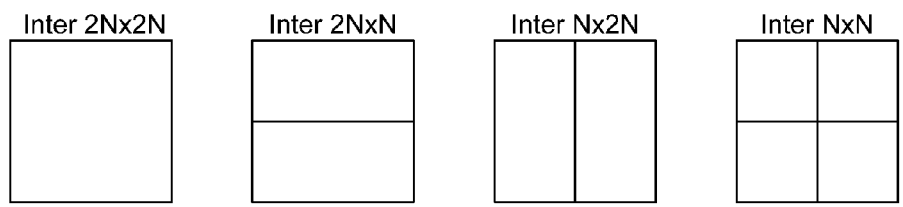
Figure 3A:
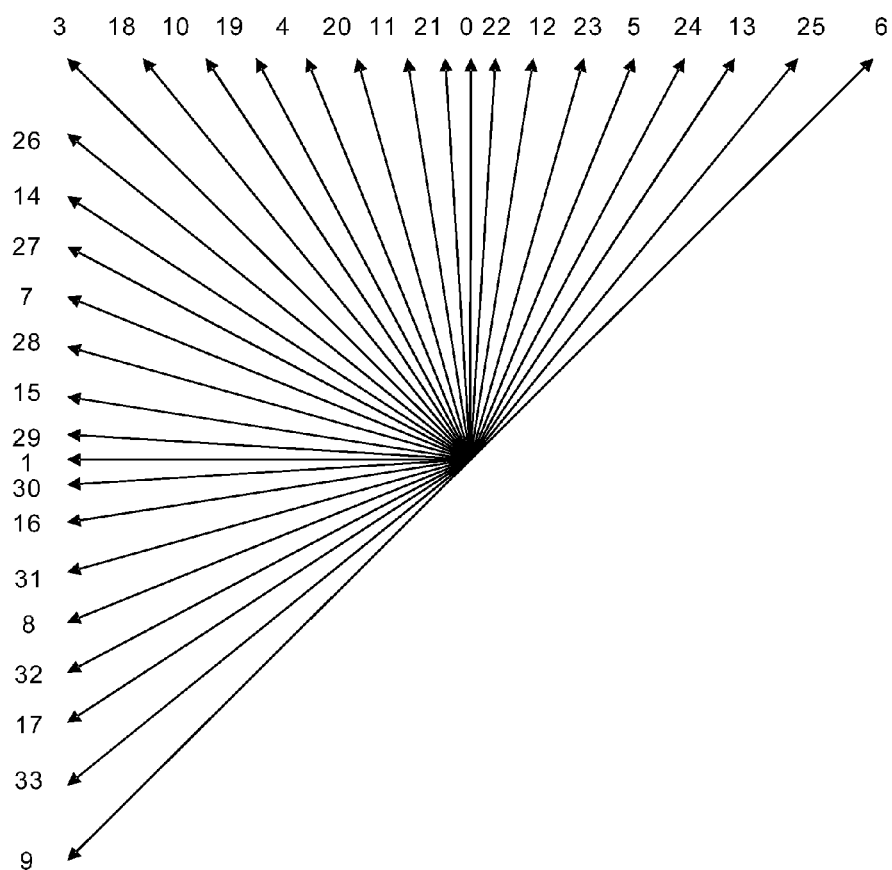
FIG. 3A illustrates Intra prediction mode directions used by High Efficiency Video Coding (HEVC), where each direction is indicated by an index.
Figure 3B:
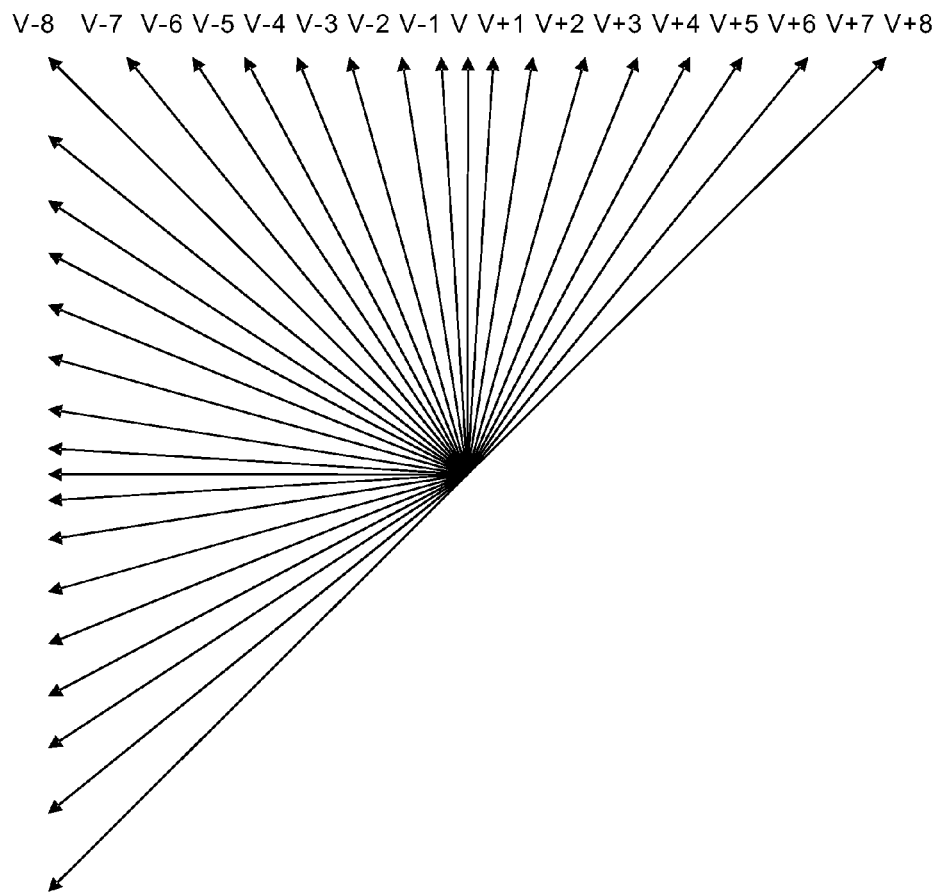
FIG. 3B illustrates Intra prediction mode directions used by High Efficiency Video Coding (HEVC), where each direction is indicated by a reference with respective to the H or V direction.

New Intra prediction modes (or mode sets) for the proposed 2N×N and N×2N Intra partition types are used according to the present invention. In one embodiment, the prediction modes and directions for partition sizes 8×4, 4×8, 16×8, 8×16, 32×16 and 16×32 are illustrated in Table 7 and Table 8, and the direction naming is shown in FIG. 3B, where each direction is indicated by a reference with respective to the horizontal (H) or vertical (V) direction. Table 7 lists the Intra prediction modes for the 2N×N Intra PU, where 4<=N<=16. Table 8 lists the Intra prediction modes for the N×2N Intra PU, where 4<=N<=16. For other 2N×N and N×2N partition sizes, the four Intra prediction modes that are used for 64×64 in HEVC Test Model, i.e. Planar, DC, Vertical and Horizontal, are used.

TABLE 7

| Index | 0 | 1 | 2 | 3 | 4 | 5 | 6 | 7 | 8 | 9 |
| --- | --- | --- | --- | --- | --- | --- | --- | --- | --- | --- |
| Physical | Planar | V | H | DC | V − 8 | V − 4 | V + 4 | V + 8 | H − 4 | H + 4 |
| Index | 10 | 11 | 12 | 13 | 14 | 15 | 16 | 17 | 18 | 19 |
| Physical | H + 8 | V − 6 | V − 2 | V + 2 | V + 6 | H − 6 | H − 2 | H + 2 | H + 6 | V − 7 |
| Index | 20 | 21 | 22 | 23 | 24 | 25 | | | | |
| Physical | V − 5 | V − 3 | V − 1 | V + 1 | V + 3 | V + 5 | | | | |

TABLE 8

| Index | 0 | 1 | 2 | 3 | 4 | 5 | 6 | 7 | 8 | 9 |
|---|---|---|---|---|---|---|---|---|---|---|
| Physical | Planar | V | H | DC | V − 8 | V − 4 | V + 4 | V + 8 | H − 4 | H + 4 |
| Index | 10 | 11 | 12 | 13 | 14 | 15 | 16 | 17 | 18 | 19 |
| Physical | H + 8 | V − 6 | V − 2 | V + 2 | V + 6 | H − 6 | H − 2 | H + 2 | H + 6 | H − 7 |
| Index | 20 | 21 | 22 | 23 | 24 | 25 | | | | |
| Physical | H − 5 | H − 3 | H − 1 | H + 1 | H + 3 | H + 5 | | | | |

In another embodiment, the prediction modes and directions for 4×2 and 2×4 Intra PUs are illustrated in Table 9 and Table 10, where the direction naming is shown in FIG. 3B. As shown in Table 9 and Table 10, a total of 10 prediction modes are used for each of 4×2 Intra PUs and 2×4 Intra PUs. Accordingly, after the two MPMs (most probable modes) are removed from the 10 modes, the remaining 8 modes require only 3 bits to present, i.e. three bits for signaling each mode.

TABLE 9

| Index | 0 | 1 | 2 | 3 | 4 | 5 | 6 | 7 | 8 | 9 |
|---|---|---|---|---|---|---|---|---|---|---|
| Physical | Planar | V | H | DC | V − 8 | V − 4 | V + 4 | V + 8 | V − 2 | V + 2 |

TABLE 10

| Index | 0 | 1 | 2 | 3 | 4 | 5 | 6 | 7 | 8 | 9 |
|---|---|---|---|---|---|---|---|---|---|---|
| Physical | Planar | V | H | DC | V − 8 | H − 4 | H + 4 | H + 8 | H − 2 | H + 2 |

In another embodiment of the present invention, more prediction modes than the number of modes for a conventional HEVC system are used. When more prediction modes based on the neighboring CU or PU of the current Intra PU are allowed according to an embodiment of the present invention, a mapping table is needed to map those "out of range" modes to the allowed modes for the current CU or PU. For example, if the neighboring block is a 16×16 Intra CU or PU, there are 35 allowed prediction modes associated with this neighbor. If the current Intra PU is a 16×8 block, then only 27 modes are allowed according to an embodiment of the present invention. In other words, there are eight modes from the neighbor which are not allowed for the current PU. Therefore, eight modes need to be mapped to the modes that are allowed for the current PU. The 35 modes that are being used in current HEVC 2N×2N Intra prediction (when 4<=N<=16) is shown in Table 11.

TABLE 11

| Index | 0 | 1 | 2 | 3 | 4 | 5 | 6 | 7 | 8 |
|---|---|---|---|---|---|---|---|---|---|
| Physical | Planar | V | H | DC | V − 8 | V − 4 | V + 4 | V + 8 | H − 4 |
| Index | 9 | 10 | 11 | 12 | 13 | 14 | 15 | 16 | 17 |
| Physical | H + 4 | H + 8 | V − 6 | V − 2 | V + 2 | V + 6 | H − 6 | H − 2 | H + 2 |
| Index | 18 | 19 | 20 | 21 | 22 | 23 | 24 | 25 | 26 |
| Physical | H + 6 | V − 7 | V − 5 | V − 3 | V − 1 | V + 1 | V + 3 | V + 5 | V + 7 |
| Index | 27 | 28 | 29 | 30 | 31 | 32 | 33 | 34 | |
| Physical | H − 7 | H − 5 | H − 3 | H − 1 | H + 1 | H + 3 | H + 5 | H + 7 | |

In one embodiment, a 9×1 mapping table, MAPPING 2N×N[9] (shown in equation (1)) is used to map modes 26-34 of Table 11 to Intra prediction modes that are allowed by an 2N×N Intra PU as shown in Table 7. The mapping table in equation (1) is an abbreviated representation that maps the 9 "out of range" modes, i.e., 26, . . . , 34, to modes {14, 15, 8, 16, 2, 2, 17, 9, 18} respectively. For example, mode index 26 (i.e., V+7) is mapped to mode index 14 (V+6) and mode index 34 (i.e., H+7) is mapped to mode index 18 (H+6).

$$\text{MAPPING\_}2N \times N[9] = \{14,15,8,16,2,2,17,9,18\} \quad (1)$$

In another embodiment, a 16×1 mapping table MAPPING_N×2N[16] (shown in equation (2)) is used to map 16 "out of range" modes (i.e., 19-34) of Table 11 to Intra prediction modes that are allowed for an N×2N Intra PU as shown in Table 8.

$$\text{MAPPING\_}N \times 2N[16] = \{11,5,12,1,1,13,6,14,19,20,\\ 21,22,23,24,25,10\} \quad (2)$$

In yet another embodiment, a 35×1 mapping table MAPPING_4×2[35] (shown in equation (3)) is used to map all the 35 modes in Table 11 to the 10 modes in Table 9.

$$\text{MAPPING\_}4 \times 2[35] = \{0,1,2,3,4,5,6,7,2,2,2,5,8,9,6,4,\\ 2,2,2,4,5,8,1,1,9,6,7,4,2,2,2,2,2,2,2\} \quad (3)$$

In a further embodiment, a 35×1 mapping table MAPPING_2×4[35] (shown in equation (4)) is used to map all the 35 modes in Table 11 to the 10 modes in Table 10.

$$\text{MAPPING\_}4 \times 2[35] = \{0,1,2,3,4,1,1,1,5,6,7,4,1,1,1,4,\\ 8,9,7,4,1,1,1,1,1,1,4,5,8,2,2,9,6,7\} \quad (4)$$

One aspect of the present invention addresses coding method for the Intra prediction modes associated with the 2N×N and N×2N Intra partition types (i.e. PUs). More specifically, the method for the Intra prediction modes according to an embodiment of the present invention uses truncated binary coding method to code the Intra prediction modes for the 2N×N and N×2N Intra partition types (i.e. PUs). As an example, the truncated binary coding may be applied to the 26 possible modes for the 2N×N and N×2N Intra PUs as shown in Table 7 and Table 8 respectively. The prediction mode for the current Intra PU may be the same as its top and/or left neighbors. The prediction modes correspond to the top and left neighbors may be used as the Most Probable Modes (MPMs). If the top or left neighbor (or their Intra prediction modes) does not exist, DC and/or Planar mode will be considered as an MPM. The two MPMs are signaled differently so that each of them can be identified individually. Consequently, codewords only need to be assigned to the 24 remaining non-MPM modes. Instead of assigning 5 bits to represent each mode by using the fixed binary representation, an embodiment according to the present invention uses truncated binary coding, as shown in Table 12. In the first exemplary implementation (Truncated Binary-1), the first eight modes use 4 bits, and the remaining modes use 5 bits. In the second exemplary implementation (Truncated Binary-2), the first 12 modes use 4 bits, the next 4 modes use 5 bits and the remaining modes use 6 bits.

TABLE 12

| Mode index (after MPM) | Standard Binary | Truncated Binary-1 | Truncated Binary-2 |
|---|---|---|---|
| 0 | 00000 | 0000 | 0000 |
| 1 | 00001 | 0001 | 0001 |
| 2 | 00010 | 0010 | 0010 |
| 3 | 00011 | 0011 | 0011 |
| 4 | 00100 | 0100 | 0100 |
| 5 | 00101 | 0101 | 0101 |
| 6 | 00110 | 0110 | 0110 |
| 7 | 00111 | 0111 | 0111 |
| 8 | 01000 | 10000 | 1000 |
| 9 | 01001 | 10001 | 1001 |
| 10 | 01010 | 10010 | 1010 |
| 11 | 01011 | 10011 | 1011 |
| 12 | 01100 | 10100 | 11000 |

TABLE 12-continued

| Mode index (after MPM) | Standard Binary | Truncated Binary-1 | Truncated Binary-2 |
|---|---|---|---|
| 13 | 01101 | 10101 | 11001 |
| 14 | 01110 | 10110 | 11010 |
| 15 | 01111 | 10111 | 11011 |
| 16 | 10000 | 11000 | 111000 |
| 17 | 10001 | 11001 | 111001 |
| 18 | 10010 | 11010 | 111010 |
| 19 | 10011 | 11011 | 111011 |
| 20 | 10100 | 11100 | 111100 |
| 21 | 10101 | 11101 | 111101 |
| 22 | 10110 | 11110 | 111110 |
| 23 | 10111 | 11111 | 111111 |

Another aspect of the present invention addresses Intra prediction modes for Intra PU with sizes 2N×(N/2) and (N/2)×2N. Intra prediction using PUs with 2N×(N/2) and (N/2)×2N sizes is also referred as SDIP (Short Distance Intra Prediction) in some literatures. In the SDIP previously proposed by others, an Intra PU may also be 32×8, 8×32, 16×4, 4×16, 8×2 and 2×8 blocks in addition to the Intra PU sizes that have been adopted by HEVC. Also in the previously proposed SDIP by others, the 35 Intra prediction modes that are used for 32×32, 16×16 and 8×8 square Intra PUs are also applied to 32×8, 8×32, 16×4, 4×16 Intra PUs. Furthermore, the 18 Intra prediction modes that are used for 4×4 square Intra PUs are applied to 8×2 and 2×8 Intra PUs.

An embodiment according to the present invention uses the prediction modes and directions defined in Table 13 for 16×4 Intra PUs and the prediction modes and directions defined in Table 14 for 4×16 Intra PUs. Same truncated binary coding methods and binary codewords as defined in Table 12 can be used for coding those modes. A person skilled in the art may use other truncated codes to practice the present invention as well.

TABLE 13

| Index | 0 | 1 | 2 | 3 | 4 | 5 | 6 | 7 | 8 | 9 |
|---|---|---|---|---|---|---|---|---|---|---|
| Physical | PLA | V | H | DC | V − 8 | V − 4 | V + 4 | V + 8 | H − 4 | H + 4 |
| Index | 10 | 11 | 12 | 13 | 14 | 15 | 16 | 17 | 18 | 19 |
| Physical | H + 8 | V − 6 | V − 2 | V + 2 | V + 6 | H − 6 | H − 2 | H + 2 | H + 6 | V − 7 |
| Index | 20 | 21 | 22 | 23 | 24 | 25 | | | | |
| Physical | V − 5 | V − 3 | V − 1 | V + 1 | V + 3 | V + 5 | | | | |

TABLE 14

| Index | 0 | 1 | 2 | 3 | 4 | 5 | 6 | 7 | 8 | 9 |
|---|---|---|---|---|---|---|---|---|---|---|
| Physical | PLA | V | H | DC | V − 8 | V − 4 | V + 4 | V + 8 | H − 4 | H + 4 |
| Index | 10 | 11 | 12 | 13 | 14 | 15 | 16 | 17 | 18 | 19 |
| Physical | H + 8 | V − 6 | V − 2 | V + 2 | V + 6 | H − 6 | H − 2 | H + 2 | H + 6 | H − 7 |
| Index | 20 | 21 | 22 | 23 | 24 | 25 | | | | |
| Physical | H − 5 | H − 3 | H − 1 | H + 1 | H + 3 | H + 5 | | | | |

Another embodiment according to the present invention uses 18 prediction modes for 8×2 Intra PUs (as shown in Table 15) and 2×8 PUs (as shown in Table 16). Therefore, after the two MPM modes are removed from the total of 18 modes, the remaining 16 modes require only 4 bits to present the remaining modes.

TABLE 15

| Index | 0 | 1 | 2 | 3 | 4 | 5 | 6 | 7 | 8 | 9 |
|---|---|---|---|---|---|---|---|---|---|---|
| Physical | PLA | V | H | DC | V − 8 | V − 4 | V + 4 | V + 8 | V − 2 | V + 2 |
| Index | 10 | 11 | 12 | 13 | 14 | 15 | 16 | 17 | | |
| Physical | V − 6 | V + 6 | V − 5 | V − 3 | V − 1 | V + 1 | V + 3 | V + 5 | | |

TABLE 16

| Index | 0 | 1 | 2 | 3 | 4 | 5 | 6 | 7 | 8 | 9 |
|---|---|---|---|---|---|---|---|---|---|---|
| Physical | PLA | V | H | DC | V − 8 | H − 4 | H + 4 | H + 8 | H − 2 | H + 2 |
| Index | 10 | 11 | 12 | 13 | 14 | 15 | 16 | 17 | | |
| Physical | H − 6 | H + 6 | H − 5 | H − 3 | H − 1 | H + 1 | H + 3 | H + 5 | | |

Yet another embodiment according to the present invention uses 10 prediction modes for 8×2 Intra PUs (as shown in Table 17) and 2×8 PUs (as shown in Table 18). Therefore, after the two MPM modes are removed from the total 10 modes, the remaining 8 modes require only 3 bits to present.

TABLE 17

| Index | 0 | 1 | 2 | 3 | 4 | 5 | 6 | 7 | 8 | 9 |
|---|---|---|---|---|---|---|---|---|---|---|
| Physical | PLA | V | H | DC | V − 8 | V − 4 | V + 4 | V + 8 | V − 2 | V + 2 |

TABLE 18

| Index | 0 | 1 | 2 | 3 | 4 | 5 | 6 | 7 | 8 | 9 |
|---|---|---|---|---|---|---|---|---|---|---|
| Physical | PLA | V | H | DC | V − 8 | H − 4 | H + 4 | H + 8 | H − 2 | H + 2 |

Figure 4A:
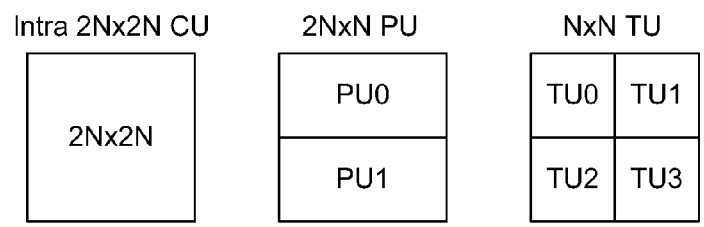
FIG. 4A-B illustrate examples of applying square and non-square transforms to 2N×N rectangular Intra prediction units according to an embodiment of the present invention.
Figure 5A:
FIG. 5A-B illustrate examples of applying square and non-square transforms to N×2N rectangular Intra prediction units according to an embodiment of the present invention.
Figure 5A:
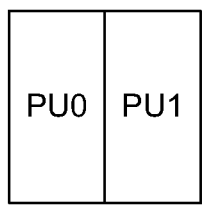
Figure 5A:
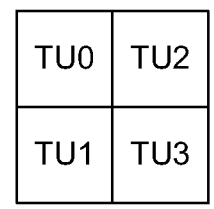

Embodiments according to the present invention allow both square transforms and non-square transforms be used to convert Intra prediction errors (also called prediction residues) corresponding to a block size of 2N×N or N×2N into frequency domain. Three possible TU (transform unit) configurations are supported according to the present invention as shown in Table 7. In Table 7, the first column shows the sizes of Intra CU supported by HM-6.0 common test conditions. The second column shows the available PU sizes associated with each CU size. The third column of the table, i.e. "Square TU", provides first TU configuration where all TUs use square transforms and so-called residue quad-tree, i.e. RQT. According to HM-6.0 common test conditions, the maximum transform size is 32×32, the minimum transform size is 4×4 and the number of RQT depths is 3. Examples of processing rectangular PUs using square TUs are shown in FIG. 4A and FIG. 5A, where a 2N×2N Intra CU is split into two 2N×N or N×2N PUs. Each 2N×N or N×2N PU is processed using two N×N square TUs, i.e. PU0 is processed using TU0 and TU1, PU1 is processed using TU2 and TU3, respectively. Each TU can be further split into smaller transform blocks through RQT.

Figure 4B:
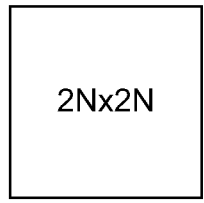
Figure 4B:
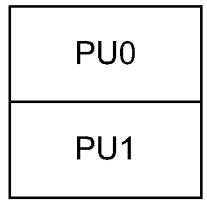
Figure 4B:
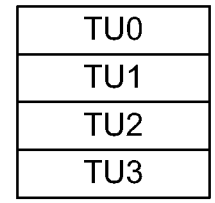
Figure 5B:
Figure 5B:
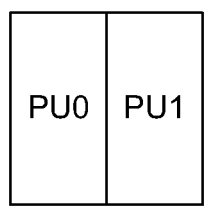
Figure 5B:
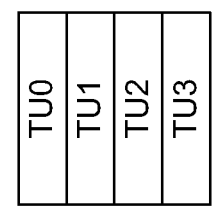

In order to take full advantage of rectangular Intra prediction partitioning and maximize the coding efficiency, non-square transforms are allowed for processing rectangular PUs. The fourth column of Table 19, i.e. "Non-square TU-1", provides TU configuration that also supports a set of non-square transforms, known as non-square quad-tree transforms (NSQT) on rectangular Intra PUs in addition to the square transforms. In this TU configuration, 2N×0.5N and 0.5N×2N TU are applied to the 2N×N and N×2N PU respectively, instead of applying N×N transform to the 2N×N or N×2N PU. Examples of processing rectangular PUs using non-square TUs are shown in FIG. 4B and FIG. 5B. In these examples, video data in TU0, TU1 and TU2 are used as the neighboring pixel on the top or on the left for predicting pixels in TU1, TU2 and TU3, respectively. TU0 and TU1 are associated with PU0 and thus share the same prediction mode specified in PU0 syntax. Similarly, TU2 and TU3 are associated with PU1 and thus share the same prediction mode specified in PU1 syntax. Each 2N×0.5N or 0.5N×2N TU can be further split into smaller 2N×0.5N or 0.5N×2N transform blocks respectively using quad-tree split. The smallest transform size allowed is 8×2 and 2×8 respectively. While the use of 8×2 and 2×8 prediction and transforms is shown to achieve some coding gain, the 2-point prediction and transforms may cause some complications in hardware implementation. Therefore, a modified configuration, i.e. "Non-square TU-2" is disclosed, where 8×2 and 2×8 TUs are eliminated and, instead 4×4 TUs are used for 8×4 and 4×8 PUs.

TABLE 19

| CU | PU | Square TU | Non-square TU-1 | Non-square TU-2 |
|---|---|---|---|---|
| 64 × 64 | 32 × 32 | 32 × 32 | 32 × 32 | 32 × 32 |
| | | 16 × 16 | 16 × 16 | 16 × 16 |
| | | 8 × 8 | 8 × 8 | 8 × 8 |
| 32 × 32 | 32 × 32 | 32 × 32 | 32 × 32 | 32 × 32 |
| | | 16 × 16 | 16 × 16 | 16 × 16 |
| | | 8 × 8 | 8 × 8 | 8 × 8 |
| | 32 × 16 | 16 × 16 | 32 × 8 | 32 × 8 |
| | | 8 × 8 | 16 × 4 | 16 × 4 |
| | 16 × 32 | 16 × 16 | 8 × 32 | 8 × 32 |
| | | 8 × 8 | 4 × 16 | 4 × 16 |
| 16 × 16 | 16 × 16 | 16 × 16 | 16 × 16 | 16 × 16 |
| | | 8 × 8 | 8 × 8 | 8 × 8 |
| | | 4 × 4 | 4 × 4 | 4 × 4 |
| | 16 × 8 | 8 × 8 | 16 × 4 | 16 × 4 |
| | | 4 × 4 | 8 × 2 | |
| | 8 × 16 | 8 × 8 | 4 × 16 | 4 × 16 |
| | | 4 × 4 | 2 × 8 | |
| 8 × 8 | 8 × 8 | 8 × 8 | 8 × 8 | 8 × 8 |
| | | 4 × 4 | 4 × 4 | 4 × 4 |
| | 8 × 4 | 4 × 4 | 8 × 2 | 4 × 4 |
| | 4 × 8 | 4 × 4 | 2 × 8 | 4 × 4 |
| | 4 × 4 | 4 × 4 | 4 × 4 | 4 × 4 |

The rectangular prediction block sizes (as shown in Table 19) are only applied in Luma Intra prediction according to an embodiment of the present invention. Chroma Intra prediction is still based on square blocks. In other words, when 2N×N or N×2N PU is selected for Luma Intra prediction for a 2N×2N CU, the block size for Chroma prediction is N×N. The reasons for maintaining square blocks for Chroma prediction are to avoid 2-point prediction and 2-point transforms for small-size CUs, and to keep the design simple. In HM-6.0, six modes are allowed for Chroma Intra prediction, which include DM (Direct mode), LM (Luma mode), Planar, DC, Vertical and Horizontal modes. The DM mode is the prediction mode that the Chroma block uses the prediction of the collocated Luma block. In most cases when the Luma PU type is 2N×2N, the prediction mode that has been used for predicting the 2N×2N Luma PU is used as the DM mode for predicting the collocated N×N Chroma block. However, when the N×N PU type is used for predicting a 2N×2N CU, the prediction mode of the first N×N Luma PU is used as the DM mode for predicting the N×N Chroma block. In an embodiment according to the present invention, when 2N×N or N×2N PU type is selected for the 2N×2N CU, there will be two DM modes, referred as DM0 from PU0 and DM1 from PU1. The six Chroma prediction modes of a candidate set are derived as follows. LM, DM0, DM1, Planar, Vertical, Horizontal, DC and Vertical+8 are listed in this order to form an ordered mode set. Among these eight modes, the first six different modes are selected as the candidate set for Chroma Intra prediction.

Figure 6:
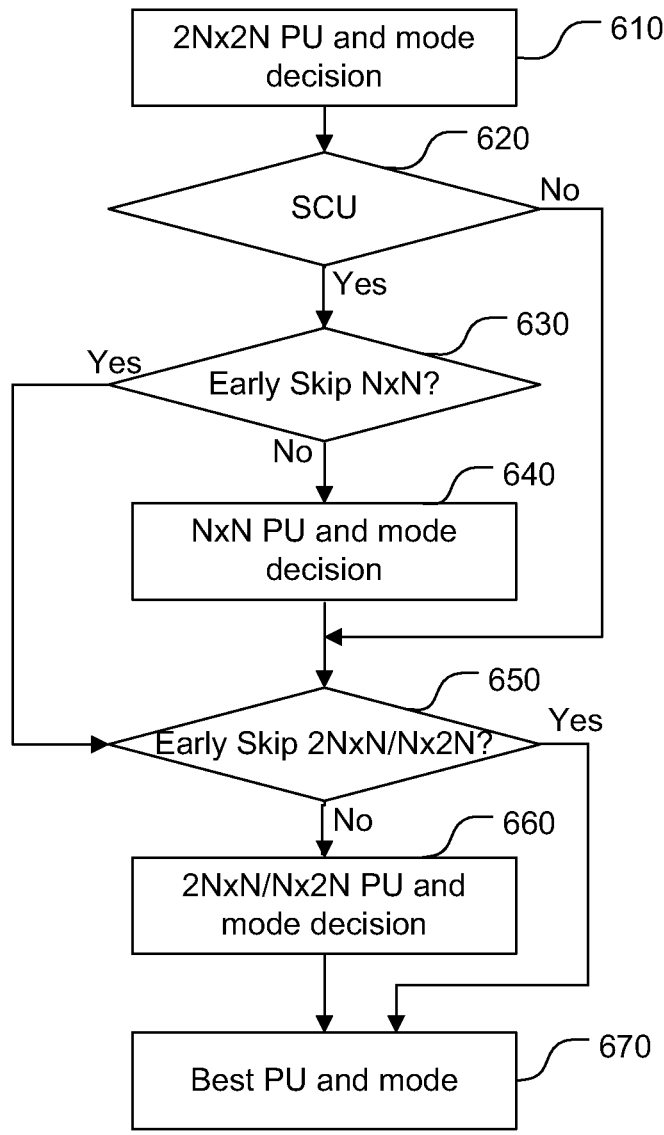
FIG. 6 illustrates an example of Intra prediction mode decision process according to an embodiment of the present invention.

The encoding process with the use of the rectangular Intra prediction partition according an embodiment of the present invention is described as follows. Early skips are used for reducing the encoder search complexity and thus achieving better tradeoff between the compression efficiency and the encoding complexity. FIG. 6 illustrates an exemplary flowchart for best PU and mode decision. To determine the PU type for an Intra CU, the minimum R-D cost of using 2N×2N PU is first calculated as shown in step 610. The Intra prediction mode that is associated with the minimum R-D cost is also obtained. Then the CU size is checked at step 620. If the CU is an SCU (i.e., the "Yes" branch of step 620), the minimum R-D cost of using N×N PU is also calculated as shown in step 640; the Intra prediction mode that is associated with the minimum R-D cost is obtained. The R-D costs of using 2N×2N and N×N partition modes are used to decide whether to skip checking the R-D cost of using 2N×N and N×2N partition modes as shown in step 650. In a reference implementation published by the same inventors (X. Zhang, S. Liu and S. Lei, "CE6.b: Rectangular (2N×N and N×2N) PU for Intra Prediction", JCTVC-H0437, Joint Collaborative Team on Video Coding (JCT-VC) of ITU-T VCEG and ISO/IEC MPEG, San Jose, Calif., February 2011), the number of bits of coding 2N×2N PU is compared with a content adaptive threshold. The threshold T is calculated as in equation (5) when QP is not equal to 0, $$T = a \times (64.0/((QP<32)?QP:64)), \quad (5)$$

where the parameter a is set as 10, 30 and 300 for 8×8, 16×16 and 32×32 CUs, respectively. If the current CU is 32×32 and the number of bits used by 2N×2N PU is less than the threshold, the non-square PU will be checked; otherwise, the non-square PU will be skipped. If the current CU is 16×16 or 8×8 and the number of bits used by the 2N×2N PU is larger than the threshold, the non-square PU will be checked; otherwise, the non-square PU will be skipped.

When the 2-point prediction and transforms are eliminated, instead 4×4 TU is used for an 8×4 and 4×8 PU, additional early skips may be applied. For an SCU, if the number of bits used by the 2N×2N PU is less than the threshold T defined in (5) with parameter a set to 5, the check of using N×N PU will be skipped. Furthermore, if R-D cost of the N×N PU is larger than the R-D cost of the 2N×2N PU, the check of using 2N×N and N×2N PUs will be skipped.

Figure 7:
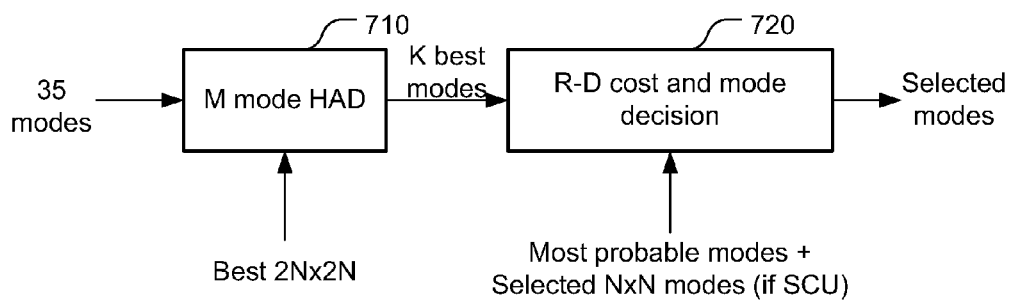
FIG. 7 illustrates an example of fast encoder mode decision for the proposed scheme with non-square Intra prediction and partition according to an embodiment of the present invention.

The mode decision for a PU is achieved in two steps, as illustrated in FIG. 7. First, a set of M (M<=35) mode candidates and the best 2N×2N mode are examined based on the Sum of Absolute Transformed Differences (SATD) in step 710. Hadamard transform is used in calculating the SATD. Among the set of M mode candidates, the K (K<=M) candidates with the least SATD cost are selected for actual R-D cost comparison along with the most probable modes (MPM) if they are different to the K best candidates, as shown in step 720. If the CU is an SCU, and 4×4 TUs are used for 8×4 and 4×8 PU, the actual R-D cost of using the best N×N modes are also calculated and compared. Finally the mode with the minimum actual R-D cost is selected as the prediction mode for this PU. In the reference implementation (X. Zhang, S. Liu and S. Lei, "CE6.b: Rectangular (2N×N and N×2N) PU for Intra Prediction", JCTVC-H0437, Joint Collaborative Team on Video Coding (JCT-VC) of ITU-T VCEG and ISO/IEC MPEG, San Jose, Calif., February 2011), M is set to 19 and K is set to 2.

The performance of a rectangular (2N×N and N×2N) Intra PU structure incorporating non-square transforms according to an embodiment of the present invention is compared with a system that only uses square transforms for a rectangular (2N×N and N×2N) Intra PU structure. In HEVC Test Model, the system supports several encoder configurations, such as All Intra, Random access, and Low delay. Also, the HEVC Test Model uses sets of test sequences, called classes, with different spatial resolutions. The performance is measured in terms of BD-rate, which is a well known performance measurement in the field of video coding. An improved performance is indicated by a negative BD-rate. Performance comparisons corresponding to the Intra PU structure incorporating the set of non-square TUs labeled as "Non-square TU-1" in Table 19 and a system that only uses square TUs are shown in Tables 20A-20C, where Table 20A corresponds to the All Intra configuration, Table 20B corresponds to the Random access configuration and Table 20C corresponds to the Low delay configuration. In Tables 20A-20C, the execution times for performing the respective encoding and decoding are also compared.

TABLE 20A

| | All Intra | | |
|---|---|---|---|
| | Y BD-rate | U BD-rate | V BD-rate |
| Class A (4K) | −0.9% | −2.0% | −2.6% |
| Class B (1080p) | −1.2% | −2.1% | −2.2% |
| Class C (WVGA) | −1.7% | −1.8% | −2.0% |
| Class D (WQVGA) | −1.7% | −1.5% | −1.5% |
| Class E (720p) | −1.9% | −4.8% | −4.1% |
| All | −1.5% | −2.3% | −2.4% |
| Enc Time[%] | | 126% | |
| Dec Time[%] | | 103% | |

TABLE 20B

| | Random access | | |
|---|---|---|---|
| | Y BD-rate | U BD-rate | V BD-rate |
| Class A (4K) | −0.6% | −1.6% | −2.2% |
| Class B (1080p) | −0.7% | −1.3% | −1.2% |
| Class C (WVGA) | −0.9% | −1.1% | −1.0% |
| Class D (WQVGA) | −0.7% | −0.8% | −0.7% |
| Class E (720p) | | | |
| All | −0.7% | −1.3% | −1.2% |
| Enc Time[%] | | 104% | |
| Dec Time[%] | | 101% | |

TABLE 20C

| | Low delay | | |
|---|---|---|---|
| | Y BD-rate | U BD-rate | V BD-rate |
| Class A (4K) | | | |
| Class B (1080p) | −0.2% | −0.4% | −0.2% |
| Class C (WVGA) | −0.3% | −0.6% | −0.4% |
| Class D (WQVGA) | −0.2% | −0.4% | −0.6% |
| Class E (720p) | −0.5% | −2.4% | −2.5% |
| All | −0.3% | −0.8% | −0.8% |
| Enc Time[%] | | 103% | |
| Dec Time[%] | | 100% | |

TABLE 21A

All Intra

| | Y BD-rate | U BD-rate | V BD-rate |
|---|---|---|---|
| Class A (4K) | −1.4% | −3.7% | −4.2% |
| Class B (1080p) | −1.3% | −3.4% | −3.5% |
| Class C (WVGA) | −1.3% | −2.4% | −2.5% |
| Class D (WQVGA) | −1.2% | −1.9% | −1.9% |
| Class E (720p) | −2.2% | −7.2% | −6.7% |
| All | −1.4% | −3.5% | −3.6% |
| Enc Time[%] | | 126% | |
| Dec Time[%] | | 103% | |

TABLE 21B

Random access

| | Y BD-rate | U BD-rate | V BD-rate |
|---|---|---|---|
| Class A (4K) | −0.9% | −2.8% | −3.2% |
| Class B (1080p) | −0.8% | −2.2% | −2.4% |
| Class C (WVGA) | −0.7% | −1.7% | −1.6% |
| Class D (WQVGA) | −0.5% | −1.6% | −1.1% |
| Class E (720p) | | | |
| All | −0.7% | −2.0% | −1.9% |
| Enc Time[%] | | 103% | |
| Dec Time[%] | | 100% | |

TABLE 21C

Low delay

| | Y BD-rate | U BD-rate | V BD-rate |
|---|---|---|---|
| Class A (4K) | | | |
| Class B (1080p) | −0.3% | −0.7% | −0.6% |
| Class C (WVGA) | −0.2% | −1.0% | −0.7% |
| Class D (WQVGA) | −0.1% | −1.0% | −1.0% |
| Class E (720p) | −0.5% | −2.7% | −5.4% |
| All | −0.3% | −1.2% | −1.6% |
| Enc Time[%] | | 102% | |
| Dec Time[%] | | 100% | |

As shown in Tables 20A-21C, a rectangular (2N×N and N×2N) Intra PU structure incorporating non-square transforms according to an embodiment of the present invention demonstrates improved performance consistently. For the All Intra configuration, the encoding time increases noticeably. However, for other cases, the encoding time and decoding time are comparable with the encoding time and decoding time of a system only uses square TUs respectively.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software code, or a combination of both. For example, an embodiment of the present invention can be a circuit integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method for Intra prediction of a block based on neighboring pixels around the block, the method comprising:
   utilizing a processor to perform:
   receiving a 2N×2N Luma block corresponding to Luma pixels of the block;
   if a size of the Luma block is larger than a smallest coding unit (SCU), setting a prediction block size of the Luma block to be one of: a square shape 2N×2N block size, a non-square shape 2N×N block size, or a non-square shape N×2N block size;
   if the size of the Luma block is equal to the SCU, setting the prediction block size of the Luma block to be one of: a square shape 2N×2N block size, a non-square shape 2N×N block size, a non-square shape N×2N block size, or a square shape N×N block size; and
   performing Intra prediction for the Luma block based on neighboring Luma pixels, wherein the Luma block is partitioned into one or more prediction units (PUs) according to partition mode.

2. The method of claim 1, wherein the non-square shape PU is processed using only square transforms or using both non-square and square transforms, and wherein each transform unit (TU) is further split into smaller TUs based on a quad-tree split.

3. The method of claim 1, the partition mode associated with said one or more PUs is indicated using a codeword table for the Luma block in Intra and Inter slices, wherein the codeword table includes entries for the 2N×N and N×2N PUs.

4. The method of claim 2, wherein the 2N×N PU or the N×2N PU is processed either using square transforms only or using both non-square and the square transforms.

5. The method of claim 4, wherein, when the 2N×N PU or the N×2N PU is processed as two N×N TUs (transform units), each of the N×N TU is further split into smaller N×N TUs based on quad-tree split if the N×N TU is larger than a smallest size, and wherein the smaller N×N TUs associated with the 2N×N PU or the N×2N PU use a same Intra prediction mode as the 2N×N PU or the N×2N PU respectively.

6. The method of claim 5, wherein the smallest size corresponds to 4×4.

7. The method of claim 4, wherein the 2N×N PU is processed as two 2N×0.5N TUs (transform units) and the 2N×0.5N TU is further split into smaller 2N×0.5N TUs based on quad-tree split if the 2N×0.5N TU is larger than a smallest size, and wherein the smaller 2N×0.5N TUs associated with the 2N×N PU use a same Intra prediction mode as the 2N×N PU.

8. The method of claim 7, wherein the smallest size corresponds to 8×2.

9. The method of claim 4, wherein the N×2N PU is processed as two 0.5N×2N TUs (transform units) and the 0.5N×2NTU is further split into smaller 0.5N×2NTUs based on quad-tree split if the 0.5N×2NTU is larger than a smallest size, and wherein the smaller 0.5N×2NTUs associated with the N×2N PU use a same Intra prediction mode as the N×2N PU.

10. The method of claim 9, wherein the smallest size corresponds to 2×8.

11. The method of claim 4, wherein the 2N×N PU is processed as two 2N×0.5N TUs (transform units) if the 2N×2N Luma CU is larger than 8×8, wherein the 2N×0.5N TU is further split into smaller 2N×0.5N TUs based on quad-tree split if the 2N×0.5N TU is larger than 16×4; and wherein the 2NxN PU is processed as two 4×4 TUs if the 2N×2N Luma CU has a size of 8×8.

12. The method of claim 4, wherein the N×2N PU is processed as two 0.5N×2NTUs (transform units) if the 2N×2N Luma CU is larger than 8×8, wherein the 0.5N×2N TU is further split into smaller 0.5N×2NTUs based on quad-tree split if the 0.5N×2NTU is larger than 4×16; and wherein the N×2N PU is processed as two 4×4 TUs if the 2N×2N Luma CU has a size of 8×8.

13. The method of claim 1, further comprising: receiving a Chroma block corresponding to Chroma pixels of the block; and performing Intra prediction for the Chroma block, wherein the Chroma block is partitioned into one or more Chroma PUs having the square shape only.

14. The method of claim 13, wherein the Chroma block corresponding to a 2N×2N CU is Intra predicted using N×N block size, wherein a candidate set of Chroma Intra prediction modes is derived for the Chroma block.

15. The method of claim 13, wherein an ordered mode set of Chroma Intra prediction modes consisting of {LM, DM0, DM1, Planar, Vertical, Horizontal, DC and Vertical+8} are used to derive a candidate set for the Chroma Intra prediction modes, wherein DM0 and DM1 correspond to two DMs (direct modes) associated with two non-square PUs of a 2N×2N Luma CU respectively, and wherein first six different modes of the ordered mode set are selected as candidate modes of the candidate set for Chroma Intra prediction.

16. An apparatus for Intra prediction of a block based on neighboring pixels around the block, the apparatus comprising at least one circuit configured for:
receiving a 2N×2N Luma block corresponding to Luma pixels of the block;
if a size of the Luma block is larger than a smallest coding unit (SCU), setting a prediction block size of the Luma block to be one of: a square shape 2N×2N block size, a non-square shape 2N×N block size, or a non-square shape N×2N block size;
if the size of the Luma block is equal to the SCU, setting the prediction block size of the Luma block to be one of: a square shape 2N×2N block size, a non-square shape 2N×N block size, a non-square shape N×2N block size, or a square shape N×N block size; and
performing Intra prediction for the Luma block based on neighboring Luma pixels, wherein the Luma block is partitioned into one or more prediction units (PUs) according to a partition mode.

17. The apparatus of claim 16, wherein the non-square shape PU is processed using only square transforms or using both non-square and square transforms, and wherein each transform unit (TU) is further split into smaller TUs based on a quad-tree split.

18. The apparatus of claim 16, the partition mode associated with said one or more PUs is indicated using a codeword table for the Luma block in Intra and Inter slices, wherein the codeword table includes entries for the 2N×N and N×2N PUs.

19. The apparatus of claim 17, wherein the 2N×N PU or the N×2N PU is processed either using square transforms only or using both non-square and the square transforms.

20. The apparatus of claim 19, wherein, when the 2N×N PU or the N×2N PU is processed as two N×N TUs (transform units), each of the N×N TU is further split into smaller N×N TUs based on quad-tree split if the N×N TU is larger than a smallest size, and wherein the smaller N×N TUs associated with the 2N×N PU or the N×2N PU use a same Intra prediction mode as the 2N×N PU or the N×2N PU respectively.

21. The apparatus of claim 19, wherein the 2N×N PU is processed as two 2N×0.5N TUs (transform units) and the 2N×0.5N TU is further split into smaller 2N×0.5N TUs based on quad-tree split if the 2N×0.5N TU is larger than a smallest size, and wherein the smaller 2N×0.5N TUs associated with the 2N×N PU use a same Intra prediction mode as the 2N×N PU.

22. The apparatus of claim 19, wherein the N×2N PU is processed as two 0.5N×2NTUs (transform units) and the 0.5N×2NTU is further split into smaller 0.5N×2NTUs based on quad-tree split if the 0.5N×2NTU is larger than a smallest size, and wherein the smaller 0.5N×2NTUs associated with the N×2N PU use a same Intra prediction mode as the N×2N PU.

23. The apparatus of claim 19, wherein the 2N×N PU is processed as two 2N×0.5N TUs (transform units) if the 2N×2N Luma CU is larger than 8×8, wherein the 2N×0.5N TU is further split into smaller 2N×0.5N TUs based on quad-tree split if the 2N×0.5N TU is larger than 16×4; and wherein the 2N×N PU is processed as two 4×4 TUs if the 2N×2N Luma CU has a size of 8×8.

24. The apparatus of claim 19, wherein the N×2N PU is processed as two 0.5N×2NTUs (transform units) if the 2N×2N Luma CU is larger than 8×8, wherein the 0.5N×2N TU is further split into smaller 0.5N×2NTUs based on quad-tree split if the 0.5N×2NTU is larger than 4×16; and wherein the N×2N PU is processed as two 4×4 TUs if the 2N×2N Luma CU has a size of 8×8.

25. The apparatus of claim 16, further comprising: means for receiving a Chroma block corresponding to Chroma pixels of the block; and means for performing Intra prediction for the Chroma, wherein the Chroma block is partitioned into one or more Chroma PUs having the square shape only.

26. The apparatus of claim 25, wherein the Chroma block corresponding to a 2N×2N CU is Intra predicted using N×N block size, wherein a candidate set of Chroma Intra prediction modes is derived for the Chroma block.

27. The apparatus of claim 25, wherein an ordered mode set of Chroma Intra prediction modes consisting of {LM, DM0, DM1, Planar, Vertical, Horizontal, DC and Vertical+8} are used to derive a candidate set for the Chroma Intra prediction modes, wherein DM0 and DM1 correspond to two DMs (direct modes) associated with two non-square PUs of a 2N×2N Luma CU respectively, and wherein first six different modes of the ordered mode set are selected as candidate modes of the candidate set for Chroma Intra prediction.

* * * * *